United States Patent
Rusch et al.

(10) Patent No.: US 10,865,679 B2
(45) Date of Patent: Dec. 15, 2020

(54) METHOD FOR OPERATING AN EXHAUST AFTER-TREATMENT SYSTEM COMPRISING AN SCR-CATALYST

(71) Applicant: MTU FRIEDRICHSHAFEN GMBH, Friedrichshafen (DE)

(72) Inventors: Klaus Rusch, Achberg (DE); Jörg Remele, Hagnau (DE); Jens Niemeyer, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/742,789

(22) PCT Filed: Jun. 28, 2016

(86) PCT No.: PCT/EP2016/001093
§ 371 (c)(1),
(2) Date: Jan. 8, 2018

(87) PCT Pub. No.: WO2017/005347
PCT Pub. Date: Jan. 12, 2017

(65) Prior Publication Data
US 2018/0202338 A1    Jul. 19, 2018

(30) Foreign Application Priority Data

Jul. 7, 2015  (DE) .................... 10 2015 212 697

(51) Int. Cl.
*F01N 3/20*    (2006.01)
*F01N 11/00*   (2006.01)

(52) U.S. Cl.
CPC .............. *F01N 3/208* (2013.01); *F01N 11/00* (2013.01); *F01N 2550/02* (2013.01);
(Continued)

(58) Field of Classification Search
CPC ........ F01N 11/00; F01N 3/208; F01N 3/2066; F01N 2550/02; F01N 2560/026;
(Continued)

(56) References Cited

U.S. PATENT DOCUMENTS 8,359,841 B2   1/2013  Goya et al.
9,170,244 B2  10/2015  Niemeyer
(Continued)

FOREIGN PATENT DOCUMENTS

CN   2578048 A1   3/2006
CN   1832794 A    9/2006
(Continued)

*Primary Examiner* — Audrey K Bradley
*Assistant Examiner* — Dapinder Singh
(74) *Attorney, Agent, or Firm* — Lucas & Mercanti, LLP; Klaus P. Stoffel

(57) ABSTRACT

A method for operating an exhaust after-treatment system including an SCR-catalyst, a metering device for dosing a reducing agent being controlled on the basis of a determining variable that influences a nitrogen-oxide concentration downstream of the SCR-catalyst. A breakthrough identification is carried out for the SCR-catalyst, wherein if a breakthrough is identified, the determining variable is altered to a higher nitrogen-oxide concentration downstream of the SCR-catalyst and the metering device is controlled in order to dose the reducing agent on the basis of the altered determining variable.

13 Claims, 3 Drawing Sheets

(52) U.S. Cl.
CPC .... *F01N 2560/026* (2013.01); *F01N 2590/02* (2013.01); *F01N 2590/08* (2013.01); *F01N 2590/10* (2013.01); *F01N 2610/02* (2013.01); *F01N 2900/0402* (2013.01); *Y02T 10/12* (2013.01); *Y02T 10/40* (2013.01)

(58) Field of Classification Search
CPC ............. F01N 2590/02; F01N 2590/08; F01N 2590/10; F01N 2610/02; F01N 2900/0402; Y02T 10/24; Y02T 10/47
USPC .................. 60/274, 277, 286, 295, 299, 301
See application file for complete search history.

(56) References Cited

U.S. PATENT DOCUMENTS

| | | |
|---|---|---|
| 9,757,717 B2 | 9/2017 | Patchett et al. |
| 2006/0096278 A1* | 5/2006 | Lueders ................. F01N 3/208 60/286 |
| 2010/0050611 A1* | 3/2010 | Walz ....................... F01N 3/208 60/286 |
| 2013/0104638 A1* | 5/2013 | Takahashi ............... F01N 3/208 73/114.71 |
| 2014/0373511 A1* | 12/2014 | Osburn .............. B01D 53/9431 60/274 |
| 2015/0033705 A1 | 2/2015 | Anilovich et al. |
| 2015/0128565 A1* | 5/2015 | Upadhyay ................. F01N 3/18 60/274 |
| 2016/0215669 A1* | 7/2016 | Matsumoto ........... F01N 3/2066 |

FOREIGN PATENT DOCUMENTS

| | | |
|---|---|---|
| CN | 101027112 A | 8/2007 |
| CN | 101784765 A | 7/2010 |
| DE | 19903439 A1 | 8/2000 |
| DE | 102011011441 B3 | 6/2012 |
| DE | 102011086625 A1 | 5/2013 |
| DE | 102014110780 A1 | 2/2015 |

* cited by examiner

METHOD FOR OPERATING AN EXHAUST AFTER-TREATMENT SYSTEM COMPRISING AN SCR-CATALYST

The present application is a 371 of International application PCT/EP2016/001093, filed Jun. 28, 2016, which claims priority of DE 10 2015 212 697.8, filed Jul. 7, 2015, the priority of these applications is hereby claimed and these applications are incorporated herein by reference.

BACKGROUND OF THE INVENTION

The invention relates to a method of operating an exhaust gas aftertreatment system, to a control unit for an exhaust gas aftertreatment system, to an exhaust gas aftertreatment system, and to an internal combustion engine.

Exhaust gas aftertreatment systems comprising at least one catalyst for selective catalytic reduction of nitrogen oxides (SCR catalyst) are used to reduce nitrogen oxide emissions to legally stipulated values. Over a service life of the exhaust gas aftertreatment system, it is possible that the maximum conversion rate that such an SCR catalyst can achieve will decrease. A typical design of an exhaust gas aftertreatment system takes account of this decrease in the performance of the SCR catalyst by means of a design reserve. If excessive aging of the system occurs in operation, this design reserve will be insufficient. If the exhaust gas aftertreatment system is operated beyond the conversion rate of the catalyst, unwanted slippage of reducing agent, especially ammonia slippage, can especially arise. It is possible to avoid the problems associated therewith not only by the establishment of a design reserve but also by recording an aging model for the SCR catalyst. It is possible here to adjust a conversion rate demanded by the SCR catalyst by means of the aging model over the operating time and to match the operating conditions that exist to the catalyst. However, this procedure is disadvantageous because reliable aging models can be converted to data only with difficulty, which especially means considerable expenditure of time if all possible combinations of operating conditions are to be covered. Furthermore, further influences that are not taken into account in the modeling of aging can occur in real operation, for example chemical aging of the system resulting from the use of an unsuitable lubricant for the internal combustion engine, and the discharge of the lubricant in the operation of the engine.

SUMMARY OF THE INVENTION

It is an object of the invention to provide a method of operating an exhaust gas aftertreatment system, a control unit for an exhaust gas aftertreatment system, an exhaust gas aftertreatment system and an internal combustion engine, wherein the drawbacks mentioned do not occur.

The object is especially achieved in that a method of operating an exhaust gas aftertreatment system comprising an SCR catalyst is provided, wherein the method has the following steps: a dosage unit for dosage of a reducing agent is actuated on the basis of a determining parameter that affects a nitrogen oxide concentration downstream of the SCR catalyst, wherein breakthrough recognition for the SCR catalyst is conducted, wherein, when a breakthrough is recognized, the determining parameter is changed toward higher nitrogen oxide concentration downstream of the SCR catalyst, and wherein the dosage unit for dosage of reducing agent is actuated on the basis of the changed determining parameter. By means of the recognition of breakthrough, it is possible to undertake adaptation to aging for the operation of the exhaust gas aftertreatment system, which—independently of any aging model—is matched to the actual aging of the SCR catalyst. Thus, it is also possible to react flexibly to excessive aging of the system in operation, for which any design reserve may be insufficient. In these cases too, by means of the adaptation to aging provided with the aid of the method, stable operation of the system is enabled. Unwanted slippage of reducing agent can be prevented by the actuation of the dosage unit on the basis of the changed determining parameter. More particularly, by means of the adaptation of aging conducted within the method, operating point-dependent limitation of the conversion rate demanded by the exhaust gas aftertreatment system is undertaken, in order to assure reliable operation of the system without reducing agent slippage even in the event of extreme aging. At the same time, the method is implementable in a simple manner and without prior knowledge, especially without a complex aging model and without considerable cost and inconvenience for the data conversion thereof. Moreover, the method can make use of measurement parameters that exist in any case in the operation of an internal combustion engine in order to conduct recognition of breakthrough and to change the determining parameter, and to actuate the dosage unit as a function of the changed determining parameter. There is thus no need for any additional measurement or control elements, and so the method can be implemented in a particularly inexpensive and simple manner, for example in a control unit of an internal combustion engine.

An exhaust gas aftertreatment system is generally understood to mean a system set up to aftertreat exhaust gas from a unit connected upstream of the exhaust gas aftertreatment system, especially an engine, especially an internal combustion engine, wherein the aftertreatment reduces at least one pollutant concentration in the exhaust gas.

An SCR catalyst is especially understood to mean a catalytic unit set up to conduct selective catalytic reduction of nitrogen oxides, wherein a reaction of a reducing agent with the exhaust gas is effected, especially in the catalytic unit. The SCR catalyst is preferably set up to reduce nitrogen oxides by reaction with ammonia.

A dosage unit for dosage of a reducing agent is understood to mean a unit by means of which a reducing agent or a reducing agent precursor product can be dosed into the exhaust gas aftertreatment system upstream of the SCR catalyst. This may especially be a valve, an injector and/or a nozzle.

The term "reducing agent" encompasses both a reducing agent in the narrower sense, which can be reacted directly, without any further chemical change, with nitrogen oxides over the SCR catalyst for reduction thereof, and precursor products for reducing agents which first react with the exhaust gas to give the actual reducing agent, the latter then being reacted with the nitrogen oxides present in the exhaust gas over the SCR catalyst. An example of such a reducing agent precursor product is a urea/water solution, which is converted to ammonia under the conditions that exist in the exhaust gas stream, in which case the ammonia as the actual reducing agent in the narrower sense is then reacted with the nitrogen oxides over the SCR catalyst.

A determining parameter which affects the nitrogen oxide concentration downstream of the SCR catalyst is especially understood to mean a parameter on which the nitrogen oxide concentration in the exhaust gas downstream of the SCR catalyst depends. This may especially be a target value for the nitrogen oxide concentration which can be used for closed-loop emission control of the exhaust gas aftertreatment system. The dosage unit is then preferably actuated as a function of this target value. This term "actuate" includes both open-loop control and closed-loop control. More preferably, closed-loop control is conducted, in which case the nitrogen oxide concentration downstream of the SCR catalyst is measured by means of a nitrogen oxide sensor, and in which case the dosage unit is preferably actuated as a function of a variance between the target value and the nitrogen oxide concentration detected by the nitrogen oxide sensor.

Recognition of breakthrough is understood to mean a method by means of which any reducing agent slippage that occurs, especially ammonia slippage, through the SCR catalyst or elevated nitrogen oxide emission as a result of elevated ammonia conversion in an ammonia barrier catalyst downstream of the SCR catalyst can be recognized in operation. A method of conducting such a recognition of breakthrough, especially a dynamic recognition of breakthrough, is disclosed in German patent specification DE 10 2011 011 441 B3, reference being made to the teaching of this document. Preferably, the method of recognizing breakthrough which is disclosed therein is used to recognize breakthrough in the context of the method proposed here.

More particularly, a dosage rate of a reducing agent added to the exhaust gas stream upstream of the SCR catalyst, using a model for the dynamic behavior of the SCR catalyst for at least one linear sensor characteristic that reflects the range of normal operation and at least one linear sensor characteristic that reflects the range of breakthrough or ammonia slippage, is used to determine an expected value for the conversion rate in each case. This expected value is compared to a real conversion rate determined with a measurement determined by a nitrogen oxide sensor arranged downstream of the SCR catalyst. For each characteristic, a respective manipulated variable for the adjustment of the real conversion rate to the expected value is calculated. That characteristic for which the smallest manipulated variable has been calculated is selected. Preferably, the monitoring here comprises the dynamic recognition of a catalyst breakthrough. Additionally or alternatively, the monitoring preferably comprises the determination of the maximum conversion rate of the SCR catalyst. Additionally or alternatively, preferably multiple different characteristics reflect the range of breakthrough. It is preferably the case that the various characteristics correspond to different maximum conversion rates. Additionally or alternatively, it is preferably the case that the parameters used in the model of the dynamic behavior of the SCR catalyst are dependent on one or more operating parameter(s) of the SCR catalyst.

A breakthrough is thus especially understood to mean a state of the SCR catalyst in which the reducing agent dosed in through the dosage unit is not fully converted over the SCR catalyst; instead, a proportion of the reducing agent is flushed through the catalyst without reacting and is present in the exhaust gas downstream of the catalyst. The reducing agent, especially ammonia, leads to an elevated sensor signal at the nitrogen oxide sensor because it typically has cross-sensitivity between nitrogen oxides on the one hand and ammonia on the other hand. It is therefore possible, by means of the above-described method of recognizing breakthrough, especially using the measurements from the nitrogen oxide sensor, to detect breakthrough and especially ammonia slippage of the SCR catalyst.

The fact that the determining parameter is changed toward higher nitrogen oxide concentration downstream of the SCR catalyst when a breakthrough is recognized means more particularly that the determining parameter is changed such that there would be a tendency to expect a rise in the nitrogen oxide concentration downstream of the SCR catalyst owing to the alteration because of the changed determining parameter and the fundamental dependence of the nitrogen oxide concentration downstream of the SCR catalyst on the determining parameter. However, this does not necessarily mean that the change in the determining parameter does indeed actually result in occurrence of a higher nitrogen oxide concentration downstream of the SCR catalyst. If, for example, the determining parameter is a target value for the nitrogen oxide concentration downstream of the SCR catalyst and the SCR catalyst is in a state of breakthrough, no closed-loop control of the nitrogen oxide concentration is possible any longer in this state of operation of the SCR catalyst. This tends to mean an elevated nitrogen oxide concentration downstream of the SCR catalyst. If the determining parameter is now changed toward higher nitrogen oxide concentration downstream of the SCR catalyst, which ultimately means that the target value for the closed-loop control of emission is raised, it is possible that stable closed-loop control of emission with the aged SCR catalyst becomes possible again. This is because, with the existing maximum conversion rate of the aged SCR catalyst, fulfillment of the new, changed target value is possible, whereas fulfillment of the preceding target value, before the change in the determining parameter, was no longer possible. It is then possible that, because the closed-loop control of emission is stable again, there is a fall in the nitrogen oxide concentration downstream of the SCR catalyst that actually occurs, even though the determining parameter tends to have been changed to higher nitrogen oxide concentration downstream of the SCR catalyst.

The fact that the dosage unit for dosage of the reducing agent is actuated on the basis of the changed determining parameter means more particularly that, rather than the (original) determining parameter, the changed determining parameter is now used in order to actuate the dosage unit, especially under open-loop or closed-loop control.

The dosage unit is preferably actuated on the basis of the determining parameter and additionally on the basis of a measurement signal from an exhaust gas sensor, especially a nitrogen oxide sensor, arranged downstream of the SCR catalyst. In this way, it is especially possible to conduct closed-loop control of emission for the exhaust gas aftertreatment system and especially for the SCR catalyst.

Preference is given to an embodiment of the method wherein the SCR catalyst in operation is monitored permanently for breakthrough. This means more particularly that the SCR catalyst, when exhaust gas is flowing through the exhaust gas aftertreatment system, i.e. it is in operation, is monitored for breakthrough continuously or at predetermined time intervals, especially periodically, especially with performance of a recognition of breakthrough by the above-described method, preferably continuously or at predetermined time intervals, especially periodically. This has the advantage that adaptation to aging for the exhaust gas aftertreatment system and especially for the SCR catalyst can be performed continually and especially from a first startup of the exhaust gas aftertreatment system. More particularly there is thus no need either for an aging model or for recourse to an operating hours counter or any other unit for detection of an operating age of the exhaust gas aftertreatment system and/or the SCR catalyst.

Preference is also given to an embodiment of the method wherein the determining parameter is a target nitrogen oxide concentration downstream of the SCR catalyst. In this case, a change in the target nitrogen oxide concentration downstream of the SCR catalyst toward a higher nitrogen oxide concentration downstream of the SCR catalyst means especially that the determining parameter is raised, i.e. changed toward a higher value. The determining parameter is preferably changed by recalculation of the determining parameter on the basis of an adaptation parameter. An adaptation parameter is understood to mean a parameter on which the determining parameter depends or which affects the determining parameter, or a parameter which is included in a calculation of the changed determining parameter. Preferably, the adaptation parameter is a predetermined nitrogen oxide conversion rate of the SCR catalyst.

It is especially the case that a change in the determining parameter is conducted by arithmetically combining the determining parameter with the adaptation parameter. The changed determining parameter is thus especially recalculated from the adaptation parameter when there is a change in the adaptation parameter. The adaptation parameter is preferably equal to a predetermined inertial value when an actual nitrogen oxide concentration—which is preferably detected by the exhaust gas sensor, especially the nitrogen oxide sensor downstream of the SCR catalyst—downstream of the SCR catalyst is equal to the determining parameter. An inertial value here is especially a value which is neutral with regard to the calculation of the determining parameter in the sense that there is no change in the determining parameter when the adaptation parameter has the inertial value. More particularly, a recalculation of the determining parameter on the basis of the inertial value does not lead to a change in the determining parameter. If the adaptation parameter used is a predetermined nitrogen oxide conversion rate of the SCR catalyst, and this predetermined conversion rate is expressed in percent, the inertial value, for example, is 1 or 100%. If the actual nitrogen oxide concentration downstream of the SCR catalyst is equal to the determining parameter, there is no need to make any alteration, and so the adaptation parameter can advantageously be equated to the inertial value.

The adaptation parameter is especially chosen such that a reduction in the adaptation parameter leads to an increase in the determining parameter. If, for example, the adaptation parameter is a predetermined nitrogen oxide conversion rate over the SCR catalyst, the effect of a reduction in this conversion rate is an increase in the target nitrogen oxide concentration downstream of the SCR catalyst as changed determining parameter, because a smaller amount of nitrogen oxide per unit time can be converted over the SCR catalyst.

The adaptation parameter is preferably reduced when a breakthrough is recognized. This is because, if a breakthrough is recognized, this means more particularly that the conversion rate of the SCR catalyst has dropped—especially because of aging effects. The effect of this can especially be that closed-loop control of emission with the SCR catalyst is no longer possible, particularly by actuation of the dosage unit. If the nitrogen oxide conversion rate as adaptation parameter is now reduced in the course of the method, and the determining parameter is recalculated on the basis of this reduced conversion rate, this leads to a rise in the target nitrogen oxide concentration downstream of the SCR catalyst as changed determining parameter, with actuation of the dosage unit on the basis of this changed determining parameter, i.e. the raised target nitrogen oxide concentration. The effect of this in turn is advantageously that closed-loop control of emission by means of the SCR catalyst and the dosage unit becomes possible again since the SCR catalyst, in spite of aging, can reach the new target nitrogen oxide concentration by means of the new actuation of the dosage unit.

It is especially the case that the adaptation parameter is chosen such that an increase in the adaptation parameter leads to a decrease in the determining parameter. If, for example, the predetermined nitrogen oxide conversion rate of the SCR catalyst as adaptation parameter is increased, this ultimately means that it is expected that the SCR catalyst will have a greater conversion rate. In this case, there is preferably a drop in the target nitrogen oxide concentration downstream of the SCR catalyst as changed determining parameter, because stable closed-loop control of emission also appears possible at the lower target value. This can especially be utilized when the adaptation parameter has been reduced too significantly in a preceding step of the method and the determining parameter has been increased too significantly. It is then possible to restore the parameters, namely in particular to increase the adaptation parameter and reduce the determining parameter, in order that the nitrogen oxide emissions in operation of the exhaust gas aftertreatment system are not too high in systematic terms. This behavior can also be utilized when the SCR catalyst is being exchanged, in which case adaptation to the novel, preferably as-new and especially non-aged SCR catalyst is possible by increasing the adaptation parameter and reducing the determining parameter.

Preference is also given to an embodiment of the method wherein the determining parameter is a target nitrogen oxide concentration downstream of the SCR catalyst, especially for closed-loop control of emission from the SCR catalyst, wherein a change in the determining parameter is conducted by arithmetically combining the determining parameter with the adaptation parameter, wherein the adaptation parameter is preferably a predetermined differential nitrogen oxide concentration, especially a predetermined—positive or negative—addition value for additive calculation together with the target nitrogen oxide concentration. The adaptation parameter is thus preferably additively combined for calculation of the changed determining parameter with a predetermined and fixed initial value for the determining parameter in each case, wherein an increase in the adaptation parameter leads to an increase in the changed determining parameter, and wherein, moreover, lowering of the adaptation parameter preferably leads to lowering of the changed determining parameter. As already described above, the adaptation parameter is preferably equal to a predetermined inertial value when an actual nitrogen oxide concentration downstream of the SCR catalyst is equal to the determining parameter. The predetermined inertial value here, in the case of additive combination of the adaptation parameter with the predetermined fixed inertial value, which especially remains fixed, for the target nitrogen oxide concentration as determining parameter, is especially equal to zero, because the additive combination in that case does not result in any change; instead, the predetermined initial value is used as determining parameter. The adaptation parameter is especially increased when a breakthrough is recognized. It is obvious that, in this way, the target nitrogen oxide concentration as determining parameter can be raised immediately as a reaction to a breakthrough, such that, more particularly, stable closed-loop control of emission is again possible by means of the SCR catalyst by actuation of the dosage unit.

Preference is also given to an embodiment of the method wherein the adaptation parameter is determined during a particular adaptation period in which the SCR catalyst is in a steady state. A steady state of the SCR catalyst and/or the exhaust gas aftertreatment system here especially means a state in which the exhaust gas temperature changes by not more than a predetermined temperature differential per unit time, for example by not more than 5° C. per minute, the state additionally lasting at least for a predetermined stabilization time, for example 30 seconds. Preferably, a steady state of the SCR catalyst means that it has an exhaust gas temperature which is constant in the aforementioned sense, and a predetermined exhaust gas mass flow rate, especially within predetermined limits. The determined adaptation period preferably lasts for as long as steady-state conditions exist over the SCR catalyst, i.e. it is arranged in the steady state. The adaptation parameter is thus preferably determined only when and only for as long as steady-state conditions exist over the SCR catalyst. If the SCR catalyst is in a non-steady state, especially a transient state, the adaptation parameter is preferably not determined, and/or the determination of the adaptation parameter is preferably stopped when non-steady-state, especially transient conditions, over the SCR catalyst occur. This is advantageous because, ultimately, reliable information about the state of aging of the SCR catalyst can be obtained only under steady-state conditions. Determination of the adaptation parameter under non-steady-state conditions as well, by contrast, harbors the risk that the actual aging of the SCR catalyst will not be detected accurately and hence the adaptation parameter will be determined incorrectly.

In the context of the method, therefore, it is preferably the case that, prior to determination of the adaptation parameter, it is checked whether the SCR catalyst is in a steady state, the adaptation parameter only being determined if the SCR catalyst is in a steady state. Moreover, it is preferably the case that the determination of the adaptation parameter is stopped when the steady state for the SCR catalyst ends.

Preference is also given to an embodiment of the method wherein the adaptation parameter within the particular adaptation period is changed incrementally toward higher nitrogen oxide concentration downstream of the SCR catalyst when a breakthrough is recognized. A change in the adaptation parameter toward higher nitrogen oxide concentration downstream of the SCR catalyst means here—analogously to the preceding remarks relating to the determining parameter—that the adaptation parameter is changed such that this results in a change in the determining parameter toward higher nitrogen oxide concentration downstream of the SCR catalyst. This does not necessarily mean—as likewise already set out above—that there will indeed be a rise in the nitrogen oxide concentration that occurs downstream of the SCR catalyst. Instead, owing to stable closed-loop control of emission which is possible again with the altered adaptation parameter and the changed determining parameter, it may be the case that there is a drop in the actual nitrogen oxide concentration downstream of the SCR catalyst.

The fact that the adaptation parameter is changed incrementally means more particularly that it is adapted in predetermined, especially constant adaptation steps, in which case an adaptation step preferably follows each recognized breakthrough. It is possible here that the adaptation parameter is calculated in an adaptation step with a predetermined adaptation factor, but it is also possible that the adaptation parameter is calculated with a predetermined summand in an adaptation step.

Overall, an incremental change in the adaptation parameter is thus preferably conducted every time a breakthrough is recognized in the specific adaptation period under steady-state conditions of the SCR catalyst.

The change in the adaptation parameter is preferably ended when no breakthrough is recognized any longer. This course of action is based on the idea that there is no longer a requirement for any adaptation of the adaptation parameter and of the determining parameter either when no breakthrough of the SCR catalyst can be detected any longer. Instead, it can be assumed that the adaptation parameter and also the determining parameter have been changed to a sufficient degree for stable operation of the SCR catalyst and of the exhaust gas aftertreatment system.

Preference is also given to an embodiment of the method wherein the adaptation parameter within the specific adaptation period is changed incrementally toward lower nitrogen oxide concentration downstream of the SCR catalyst when no breakthrough is recognized, and when the adaptation parameter is not equal to the predetermined inertial value. This course of action is based on the idea that overadjustment may have occurred in the event of a prior adjustment of the adaptation parameter toward higher nitrogen oxide concentration, as a result of which the nitrogen oxide emissions from the exhaust gas aftertreatment system will be too high in systematic terms. This overadjustment can advantageously be reversed when the adaptation parameter is changed back again, namely toward lower nitrogen oxide concentration, when no breakthrough is recognized any longer, although such a readjustment is conducted only when the adaptation parameter has indeed already been changed, i.e. does not correspond to the predetermined inertial value—preferably especially chosen as initial value at the start of the method. This is because, if the adaptation parameter is equal to the predetermined inertial value, this especially has a value adjusted to a non-aged, especially as-new SCR catalyst, in which case there is no point in readjusting the adaptation parameter toward lower nitrogen oxide concentration downstream of the SCR catalyst.

The change in the adaptation parameter toward lower nitrogen oxide concentration downstream of the SCR catalyst is preferably ended as soon as the adaptation parameter is equal to the predetermined inertial value. This especially corresponds to ending of the change when an initial starting value of the adaptation parameter is attained again and the condition for an as-new SCR catalyst is effectively re-established.

The change in the adaptation parameter toward lower nitrogen oxide concentration downstream of the SCR catalyst is preferably alternatively or additionally ended when a breakthrough is recognized. This course of action is based on the idea that a further change in the adaptation parameter toward lower nitrogen oxide concentration is no longer sensible when there is a breakthrough of the SCR catalyst, which especially means that successful closed-loop control of emission with the SCR catalyst is no longer possible with the current value of the changed determining parameter, such that there is no point in any further adjustment of the adaptation parameter effectively in the wrong direction. Preferably, when a breakthrough is recognized, a last alteration increment for the adaptation parameter, especially a last alteration increment toward lower nitrogen oxide concentration downstream of the SCR catalyst, is reversed again. This course of action is based on the idea that the last alteration step for the adaptation parameter toward lower nitrogen oxide concentration was apparently one step too many, because the catalyst is again in the state of breakthrough. There is the chance that reversing the last alteration increment will again establish a state in which the SCR catalyst can be utilized for successful closed-loop control of emission.

Preference is also given to an embodiment of the method wherein, in the case that the adaptation parameter is equal to the predetermined inertial value, the adaptation parameter in the specific adaptation period is kept equal to the predetermined inertial value when no breakthrough is recognized. In this way, it is advantageously possible to avoid any change in the adaptation parameter and hence also in the determining parameter if no relevant aging of the SCR catalyst is detectable, such that successful closed-loop control of emission with the SCR catalyst still also seems possible on the basis of the unchanged determining parameter.

Preference is also given to an embodiment of the method wherein a warning signal is generated on attainment or exceedance of a predetermined limit in the adaptation parameter, or on attainment or exceedance of a predetermined limit in the actual nitrogen oxide concentration downstream of the SCR catalyst. It is thus possible to signal to an operator of the exhaust gas aftertreatment system and especially an operator of an internal combustion engine connected upstream of the exhaust gas aftertreatment system that a critical state of the SCR catalyst has been attained, in which exceedance especially of a legal limit for nitrogen oxide emissions is possible, especially where compliance with the legal limit with the aged SCR catalyst no longer appears possible even with application of the method proposed here. In response to the warning signal, the operator can especially exchange the SCR catalyst for a newer or as-new SCR catalyst.

Alternatively or additionally to the generation of the warning signal, preference is given to initiating a decrease in a nitrogen oxide concentration in the exhaust gas upstream of the SCR catalyst. This means more particularly that an exhaust gas-generating unit connected upstream of the exhaust gas aftertreatment system, especially an internal combustion engine, is actuated in a changed manner, especially with changed operating parameters, such that the raw nitrogen oxide emissions from the upstream unit are reduced. In this way, it may especially still be possible to comply with a legal limit for nitrogen oxide emissions from the exhaust gas aftertreatment system at least for a particular period of time in spite of the aged SCR catalyst before exchange of the SCR catalyst becomes necessary. The nitrogen oxide concentration downstream of the SCR catalyst that results from the predetermined limit is preferably greater than or equal to the target nitrogen oxide concentration downstream of the SCR catalyst, i.e. is especially preferably greater than or equal to the determining parameter. This configuration is based on the idea that the determining parameter, and especially the target nitrogen oxide concentration downstream of the SCR catalyst, is to be especially less than or at most equal to a legal limit, in order to assure that the legal limit is always complied with if possible in the operation of the exhaust gas aftertreatment system.

Preference is also given to an embodiment of the method wherein data for determination of the adaptation parameter are recorded in an overwritable characteristic map during a first adaptation period, wherein the data are provided in a second adaptation period, wherein the second adaptation period follows after the first adaptation period in time. The expression "data for determination of the adaptation parameter" is especially understood to mean at least one item of data from which the adaptation parameter can be determined or derived. This may especially also be the current value of the adaptation parameter itself. The overwritable characteristic map is especially a learning characteristic map which is adjusted in the course of the adaptation of the operation of the exhaust gas aftertreatment system, especially with adjustment of the data for determination of the adaptation parameter to an actual aging state of the SCR catalyst. The fact that the data are recorded in the first adaptation period at an earlier juncture and provided in the second adaptation period at a later juncture means especially that—especially after interruption between two adaptation periods owing to a non-steady state of the SCR catalyst—the data for determination of the adaptation parameter from the last adaptation period can be used further in the subsequent adaptation period. In that case, there is thus no need for a completely new determination of the adaptation parameter in a next steady-state phase of the SCR catalyst after a non-steady-state phase; instead, it can be continued with the last value attained.

In the overwritable characteristic map, especially the learning characteristic map, the data or the adaptation parameter are preferably recorded as a function of at least one operating parameter of the SCR catalyst, especially a temperature of the SCR catalyst or an exhaust gas temperature in the SCR catalyst, and/or an exhaust gas mass flow rate through the SCR catalyst. The adaptation parameter itself is thus preferably operating point-dependent, and is recorded in operating point-dependent form in the learning characteristic map. The overwritable characteristic map is thus preferably defined via at least one operating parameter of the SCR catalyst.

Alternatively or additionally, it is also possible that a current value for the changed determining parameter in the first adaptation period is recorded in the overwritable characteristic map, and is then provided in the second adaptation period. In this case, the current value for the changed determining parameter can also be used as an item of data for determination of the adaptation parameter, especially when the current value for the changed determining parameter in each case is calculated from a predetermined, fixed initial value for the determining parameter and the current adaptation parameter. In this case, the adaptation parameter can be determined by means of simple calculation of the current, changed determining parameter with the predetermined, fixed determining parameter.

The use of an overwritable characteristic map, especially a learning characteristic map, also makes it possible to use, for the target nitrogen oxide concentration downstream of the SCR catalyst, as determining parameter, a predetermined characteristic map which is fixed, i.e. constant over time, from which, especially in an operating point-dependent manner, the predetermined, fixed initial value for the determining parameter is read off in each case and is then computed together with the adaptation parameter for calculation of the current, changed determining parameter. This has the advantage that the characteristic map of the initial values is always preserved, with the possibility of direct access to these initial values again—especially after exchange of an SCR catalyst.

The predetermined, fixed initial value for the determining parameter is preferably not a single value but a multitude of operating point-dependent values that are preferably recorded in a characteristic map. This characteristic map is preferably configured as a fixed, steady-state, especially non-overwritable characteristic map.

The predetermined, fixed initial value for the determining parameter is thus preferably recorded in a characteristic map as a function of a state of operation of a unit connected upstream of the exhaust gas aftertreatment system, especially an internal combustion engine. More preferably, the predetermined, fixed initial value is recorded in the characteristic map as a function of a speed and a torque of the internal combustion engine. It is then always possible to read out, in an operating point-dependent manner, a value for the predetermined, fixed initial value from the characteristic map.

Preference is also given to an embodiment of the method wherein the overwritable characteristic map is not written with data in predetermined states of operation of the exhaust gas aftertreatment system, or in predetermined states of operation of a unit operatively connected to the exhaust gas aftertreatment system, especially an exhaust gas-generating unit.

This has the advantage that the overwritable characteristic map is not filled with data when states of operation occur in which no viable or realistic determination of the state of aging of the SCR catalyst is possible, even when it is in a steady state. The predetermined states of operation are preferably selected correspondingly.

It is possible that a change in the adaptation parameter is nevertheless also undertaken in such predetermined states of operation, if steady-state conditions exist over the SCR catalyst, but the changed values for the adaptation parameter in that case are not recorded in the overwritable characteristic map. In such states of operation, the dosage unit is actuated on the basis of the changed determining parameter, but there is no recording, i.e. storage of a corresponding value, in order to prevent maladjustment of the learning characteristic map.

Alternatively, it is also possible that there is no adjustment of the adaptation parameter at least in some predetermined states of operation of this kind, such that the exhaust gas aftertreatment system is then operated with the determining parameter kept constant.

Such a predetermined state of operation exists, for example, when there is a failure of a sensor for detection of a high pressure in a common high-pressure storage means to which a multitude of injectors are assigned, namely what is called a rail pressure sensor. In this case, the torque calculation for an internal combustion engine becomes inexact, and the calculation of a target nitrogen oxide concentration based on the incorrectly determined, current state of operation gives incorrect values. In this case, there is preferably no recording of data in the overwritable characteristic map. It is then especially also possible to prevent any change in the adaptation parameter.

A further predetermined state of operation of this kind exists when there is a failure of a speed sensor of an internal combustion engine. Operation is then typically switched to a camshaft sensor, which leads to inexactness in a determination of commencement of injection from injectors, and hence to changed combustion in combustion chambers of the internal combustion engine, and to altered emission values. In this case, preferably, the adaptation parameter is still changed, but the changed values are not stored in the overwritable characteristic map.

Even when exhaust gas recycling for the internal combustion engine is shut down owing to excess temperature, which leads to elevated raw nitrogen oxide emission, the adaptation is still conducted, but no data are stored in the learning characteristic map.

In the case of elevated hydrocarbon emissions too, for example owing to a cold start of an internal combustion engine or an active regeneration of a particulate filter, there is preferably no recording of data in the overwritable characteristic map, since such states of operation are typically not covered by a catalyst model.

The object is also achieved by providing a control unit for an exhaust gas aftertreatment system comprising an SCR catalyst, wherein the control unit is set up to actuate a dosage unit for dosage of a reducing agent on the basis of a determining parameter that affects a nitrogen oxide concentration downstream of the SCR catalyst, wherein the control unit is further set up to conduct recognition of breakthrough for the SCR catalyst, and, when a breakthrough is recognized, to change the determining parameter toward higher nitrogen oxide concentration downstream of the SCR catalyst. The control unit is further set up to actuate the dosage unit for dosage of the reducing agent on the basis of the changed determining parameter. The control unit is especially set up to conduct a method according to any of the embodiments described above. Particularly the advantages that have already been elucidated in connection with the method are implemented in connection with the control unit.

It is possible that the control unit takes the form of a separate control unit for actuation of the exhaust gas aftertreatment system.

Alternatively, it is possible that the control unit used for the exhaust gas aftertreatment system takes the form of a control unit, especially a central control device (engine control unit—ECU) of an internal combustion engine, which is operatively connected to the exhaust gas aftertreatment system, or that the control unit takes the form of the central control device of the internal combustion engine.

The performance of the method may be implemented in a fixed manner in an electronic structure, especially an item of hardware, of the control unit. Alternatively or additionally, it is possible that a computer program product has been loaded into the control unit, having machine-readable instructions on the basis of which an embodiment of the method can be performed when the computer program product is running on the control unit.

The invention also includes a computer program product having machine-readable instructions on the basis of which one of the above-described embodiments of the method can be performed when the computer program product is running on a processing unit, especially a control unit for an exhaust gas aftertreatment system, more particularly a central control device of an internal combustion engine.

The invention also includes a data carrier comprising such a computer program product.

The control unit preferably has an interface for connection to the dosage unit, especially for actuation of the dosage unit. In addition, the control unit preferably has an interface for connection to an exhaust gas sensor, especially a nitrogen oxide sensor.

An overwritable characteristic map, especially a learning characteristic map, is preferably recorded in the control unit, in which data for determination of the adaptation parameter can be stored. In addition, a steady-state, invariable characteristic map is preferably recorded in the control unit, in which predetermined, fixed initial values for the determination parameter are recorded—especially in an operating point-dependent manner.

The object is also achieved by providing an exhaust gas aftertreatment system comprising an SCR catalyst, a dosage unit—especially arranged upstream of the SCR catalyst—for dosage of a reducing agent, and a control unit, especially a control unit according to one of the working examples described above. This control unit is preferably operatively connected to the dosage unit for actuation thereof. In addition, the exhaust gas aftertreatment system preferably comprises an exhaust gas sensor, especially a nitrogen oxide sensor, preferably arranged downstream of the SCR catalyst and set up to detect a nitrogen oxide concentration in the exhaust gas downstream of the SCR catalyst. Preferably, the control unit is operatively connected to the exhaust gas sensor. The control unit of the exhaust gas aftertreatment system is especially preferably set up to conduct at least one of the above-described embodiments of the method. Particularly the advantages that have already been elucidated in connection with the method and the control unit arise in connection with the exhaust gas aftertreatment system.

Preference is given to a working example of the exhaust gas aftertreatment system which has an oxidation catalyst connected downstream of the SCR catalyst, preferably for avoidance of reducing agent emission, especially ammonia emission, from the exhaust gas aftertreatment system. An oxidation catalyst of this kind is also referred to as barrier catalyst, which is especially intended to prevent reducing agent exiting from the exhaust gas aftertreatment system, i.e. especially ammonia slippage therefrom. Especially when the exhaust gas aftertreatment system includes such a barrier catalyst, breakthrough of the SCR catalyst can also be recognized by means of a nitrogen oxide sensor arranged downstream of the oxidation catalyst, by an elevated emission of nitrogen oxide owing to an elevated ammonia conversion in the barrier catalyst.

The object is finally also achieved by providing an internal combustion engine having a control unit according to any of the above-described working examples and/or an exhaust gas aftertreatment system according to any of the above-described working examples. Particularly the advantages that have already been elucidated previously in connection with the method, the control unit and the exhaust gas aftertreatment system arise in connection with the internal combustion engine.

The internal combustion engine preferably takes the form of a reciprocating piston engine. It is possible that the internal combustion engine is set up to drive a passenger vehicle, a heavy goods vehicle or a utility vehicle. In a preferred working example, the internal combustion engine serves to drive land or water vehicles, heavy vehicles in particular, for example mine vehicles, trains, wherein the internal combustion engine is used in a locomotive or a power car, or ships. It is also possible to use the internal combustion engine to drive a vehicle serving for defense purposes, for example a tank. A working example of the internal combustion engine is preferably also used in stationary form, for example for stationary energy supply in emergency power operation, continuous load operation or peak load operation, in which case the internal combustion engine preferably drives a generator. Another possibility is stationary use of the internal combustion engine for driving of auxiliary appliances, for example of firefighting pumps on oil rigs. In addition, it is possible to use the internal combustion engine in the field of production of fossil raw materials and especially fuels, for example oil and/or gas. It is also possible to use the internal combustion engine in the industrial sector or in the construction sector, for example in a construction or building machine, for example in a crane or a digger. The internal combustion engine preferably takes the form of a diesel engine, a gasoline engine, or a gas engine for operation with natural gas, biogas, special gas or another suitable gas. Especially when the internal combustion engine takes the form of a gasoline engine, it is suitable for use in a combined heat and power plant for stationary energy generation.

What is found overall is that the method provides adaptation to aging which serves to enable reliable operation of the exhaust gas aftertreatment system even in the event of aging that goes beyond the reserve planned in the design of the system. For this purpose, especially at steady-state operating points, a recognition of breakthrough is evaluated. If an operating point is recognized as being steady-state, according to the situation, the following actions especially take place:

If there is no shift in the determining parameter, especially the target nitrogen oxide concentration downstream of the SCR catalyst, and no breakthrough is recognized, there is no further action.

If there is a steady-state operating point and breakthroughs are being recognized, the determining parameter is changed, especially increased, until the system can be operated stably in a steady state.

If there is already a changed determining parameter and the exhaust gas aftertreatment system is being operated in a steady state at the corresponding point, it is checked whether the change in the determining parameter, especially the changed adaptation parameter, can be reversed. For this purpose, more particularly, the determining parameter is lowered stepwise until the exhaust gas aftertreatment system can no longer be brought under stable closed-loop control.

In a preferred embodiment of the method, no change in the target nitrogen oxide concentration downstream of the SCR catalyst is undertaken directly; instead, a predetermined nitrogen oxide conversion rate is changed as adaptation parameter. If this nitrogen oxide conversion rate is lowered, there is an increase in the target nitrogen oxide concentration as determining parameter. The use of the nitrogen oxide conversion rate as adaptation parameter, especially compared to use of an additive adaptation parameter in the sense of a differential nitrogen oxide concentration, has the advantage that deviations in the raw emissions of a unit connected upstream of the exhaust gas aftertreatment system from design characteristics very rarely result in an intervention.

Alterations to a learning characteristic map for adjustment of the adaptation parameter are preferably undertaken only when there is normal operation of the internal combustion engine, for example without existing sensor faults. Otherwise, a change in the adaptation parameter and/or in the determining parameter may be undertaken, but this is not stored in the learning characteristic map.

If the adaptation parameter used is a nitrogen oxide conversion rate and the learning characteristic map is initially merely given the value of 1, in the event of a first occurrence of a breakthrough, the first adaptation value inserted for the adaptation parameter may be a calculated percentage actual nitrogen oxide conversion.

It is possible to react to an adaptation of the maximum conversion rate of the nitrogen oxide catalyst, as which the target conversion rate as adaptation parameter can be regarded, in various ways: it is possible that an internal combustion engine connected upstream of the exhaust gas aftertreatment system is actuated so as to result in changed raw emissions in order to be able to comply with the legally stipulated emissions downstream of the SCR catalyst even in the event of a lower maximum conversion rate of the SCR catalyst. Additionally or alternatively, it is possible to issue an emission warning, especially as a message to the operator of the system, which can especially indicate that an exchange of the SCR catalyst is required.

The method of the invention for adaptation to aging in SCR catalysts preferably gives rise especially to the following advantages: no aging model is required, which means that the cost and inconvenience involved in the formulation of such a model is eliminated, and in particular the high cost and inconvenience of data conversion for obtaining an exact model and the time demands for necessary trials can be dispensed with. In the context of the method, adaptation to the respective real system takes place. The real aging that exists is taken into account. If an exchange of the SCR catalyst takes place, any adaptation that has already been effected in the preceding operation, in the context of the method, is preferably reversed stepwise without needing to undertake, for example, a manual reset—especially in control software, for example by pressing a reset button.

At the same time, a structure in which the operating point-dependent maximum conversion rate of the SCR catalyst in particular is limited, in the event of deviations of the raw emissions from the internal combustion engine, will very rarely result in adaptation steps, especially by comparison with direct adaptation of the determining parameter by additive calculation of a differential nitrogen oxide concentration as adaptation parameter.

The description of the method on the one hand and of the control unit, the exhaust gas aftertreatment system and the internal combustion engine on the other hand should be regarded as being complementary to one another. More particularly, method steps that have been described explicitly or implicitly in connection with the control unit, the exhaust gas aftertreatment system and/or the internal combustion engine, preferably individually or combined with one another, are steps of a preferred embodiment of the method. Features of the control unit, the exhaust gas aftertreatment system and/or the internal combustion engine that have been elucidated explicitly or implicitly in connection with the method, preferably individually or in combination with one another, are features of a preferred working example of the control unit, the exhaust gas aftertreatment system and/or the internal combustion engine. The method preferably features at least one method step occasioned by at least one feature of an inventive or preferred working example of the control unit, the exhaust gas aftertreatment system and/or the internal combustion engine. The control unit, the exhaust gas aftertreatment system and/or the internal combustion engine preferably feature(s) at least one feature occasioned by at least one step of an inventive or preferred embodiment of the method.

BRIEF DESCRIPTION OF THE DRAWING

The invention is elucidated in detail hereinafter with reference to the drawing. The figures show.

DETAILED DESCRIPTION OF THE INVENTION

Figure 1:
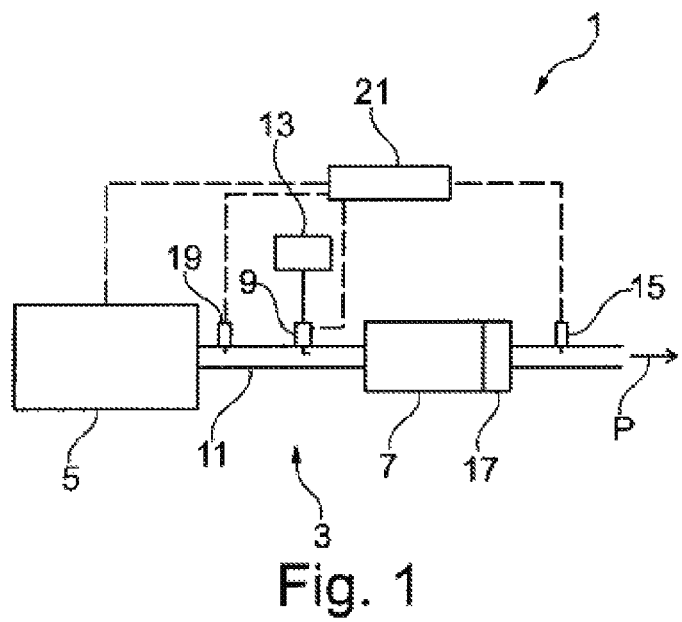
FIG. 1 a schematic diagram of a working example of an internal combustion engine comprising an exhaust gas aftertreatment system and a control unit.

FIG. 1 shows a schematic diagram of a working example of an internal combustion engine 1 having an exhaust gas aftertreatment system 3. The internal combustion engine 1 especially has an engine block 5, wherein exhaust gas emitted by the engine block 5 can flow through the exhaust gas aftertreatment system 3 and—as shown by an arrow P—further to an outlet or exhaust which is not shown. The exhaust gas aftertreatment system 3 has an SCR catalyst 7 set up for selective catalytic reduction of nitrogen oxides. In addition, the exhaust gas aftertreatment system 3 has a dosage unit 9 for dosage of a reducing agent or a reducing agent precursor product into an exhaust gas pathway 11 of the exhaust gas aftertreatment system 3, wherein the dosage unit 9 is arranged upstream of the SCR catalyst 7. The dosage unit 9 is in fluid connection to a reservoir 13, wherein a reducing agent or a reducing agent precursor product, especially a urea/water solution, can be conveyed from the reservoir 13 to the dosage unit 9 and can be metered into the exhaust gas pathway 11 thereby.

Downstream of the SCR catalyst 7 is arranged an exhaust gas sensor, here especially a first nitrogen oxide sensor 15, with which a nitrogen oxide concentration downstream of the SCR catalyst 7 is detectable. The nitrogen oxide sensor has cross-sensitivity with respect to ammonia, such that ammonia exiting from the SCR catalyst—in fundamentally the same way as nitrogen oxides present by the offgas—leads to an increase in the measurement of the nitrogen oxide sensor 15.

In the present working example of the internal combustion engine 1 and of the exhaust gas aftertreatment system 3, however, an oxidation catalyst 17 as barrier catalyst is also arranged immediately downstream of the SCR catalyst 7, and this oxidizes ammonia exiting from the SCR catalyst up to nitrogen oxides. In this case, the ammonia oxidized up to nitrogen oxides leads directly to an increase in the measurement from the nitrogen oxide sensor 15 when the SCR catalyst 7 is in a state of breakthrough.

Also arranged in the exhaust gas pathway 11 upstream of the SCR catalyst 7 and preferably also upstream of the dosage unit 9 is a further exhaust gas sensor, here namely a second nitrogen oxide sensor 19, which especially serves to detect raw nitrogen oxide emissions from the engine block 5.

The working example of the internal combustion engine 1 and of the exhaust gas aftertreatment system 3 shown in FIG. 1 also has a control unit 21 operatively connected to the dosage unit 9 and to the first nitrogen oxide sensor 15. Preferably, the control unit 21 is also operatively connected to the second nitrogen oxide sensor 19 and to the engine block 5. This control unit 21 is especially set up to actuate the dosage unit 9, in order to dose the reducing agent or reducing agent precursor product into the exhaust gas pathway 11 as a function of a determining parameter that affects a nitrogen oxide concentration downstream of the SCR catalyst, wherein the control unit 21 is additionally set up to conduct a recognition of breakthrough for the SCR catalyst, especially on the basis of the measurement from the first nitrogen oxide sensor 15 is, more preferably by means of a method as described in German patent specification DE 10 2011 011 441 B3. The control unit 21 is also designed to change the determining parameter toward a nitrogen oxide concentration that tends to be higher downstream of the SCR catalyst 7 when a breakthrough for the SCR catalyst 7 is being recognized. The control unit 21 is also set up to actuate the dosage unit 9 for dosage of the reducing agent or reducing agent precursor product on the basis of the changed determining parameter, and it is especially set up to conduct one of the above-described embodiments of the method.

This control unit 21 is especially set up to generate a warning signal on attainment or exceedance of a limit in an adaptation parameter or the actual nitrogen oxide concentration downstream of the SCR catalyst 7, which is detected by means of the first nitrogen oxide sensor 15. Alternatively or additionally, the control unit 21 is preferably set up to initiate a decrease in a nitrogen oxide concentration upstream of the SCR catalyst 7 in the event of attainment or exceedance of this limit. This purpose is served more particularly by the operative connection of the control unit 21 to the engine block 5, in that the engine block 5, especially at least one operating parameter thereof, can be changed by the control unit 21 such that the raw nitrogen oxide emissions from the engine block 5 are reduced. This can be verified by means of the second nitrogen oxide sensor 19, especially since it is preferably operatively connected to the control unit 21. It is especially possible here to implement closed-loop control of the raw nitrogen oxide emissions from the engine block 5.

Figure 2:
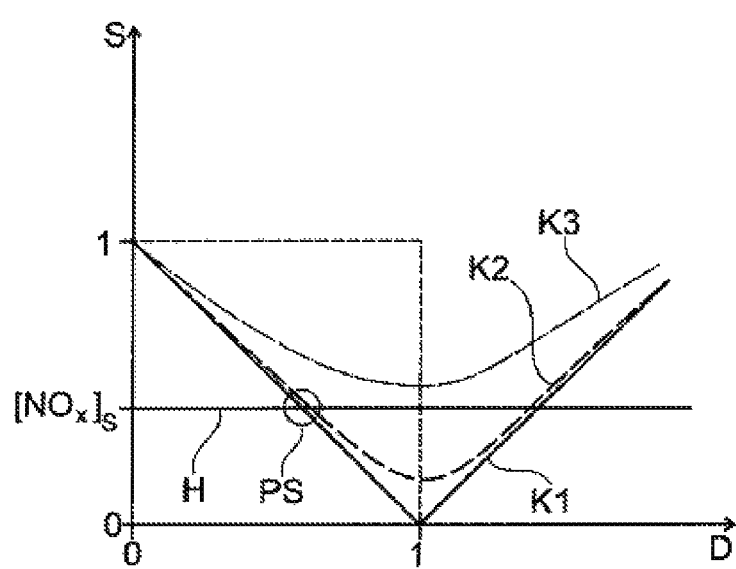
FIG. 2 a schematic diagrammatic representation of aging characteristics of an SCR catalyst and of a mode of function in principle for one embodiment of the method.

FIG. 2 shows a schematic, diagrammatic representation of the mode of function of the method of the invention. Plotted here on a vertical axis of the diagram is a measurement S from the first nitrogen oxide sensor 15 as a measure of a combined nitrogen oxide and ammonia concentration in the exhaust gas downstream of the SCR catalyst 7, based on the raw emissions of nitrogen oxide from the engine block 5, such that the value 1 on the vertical axis corresponds to a state in which the raw nitrogen oxide emissions from the engine block 5 are allowed to pass completely through the SCR catalyst 7. Plotted on the horizontal axis is a dosage rate D of reducing agent or a reducing agent precursor product from the dosage unit 9, based on a conversion of reducing agent in the SCR catalyst 7. The value identified by 1 corresponds here to a complete conversion of the total amount of reducing agent injected over the SCR catalyst 7.

The horizontal line H plotted onto the diagram is a target nitrogen oxide value $[NO_x]_S$, which is used as determining parameter within the method.

A first, solid curve K1 shows the behavior of an ideal SCR catalyst 7. Proceeding from a vanishingly small dosage rate where there is no conversion of nitrogen oxides over the SCR catalyst 7, there is a drop in the measurement S from the first nitrogen oxide sensor 15 with increasing dosage rate until, at the value of 1 for the dosage rate, i.e. a complete conversion of reducing agent over the SCR catalyst 7, there is complete reduction of the nitrogen oxides in the SCR catalyst 7, and so the signal from the first nitrogen oxide sensor 15 also becomes zero. If the dosage rate is increased over and above the value of 1, there is a rise in the measurement signal from the first nitrogen oxide sensor 15 again because unconverted reducing agent is now being allowed to pass through the SCR catalyst 7. In this respect, there is thus a breakthrough of the SCR catalyst 7, or slippage of reducing agent or ammonia. Owing to the cross-sensitivity of the first nitrogen oxide sensor 15 between nitrogen oxides on the one hand and ammonia on the other hand, this leads to a rising signal S from the first nitrogen oxide sensor 15. In a case in which an oxidation catalyst 17 is provided downstream of the SCR catalyst 7, unconverted ammonia in particular is oxidized up to nitrogen oxides, such that the measurement S at dosage rates greater than 1 rises here because nitrogen oxides which are produced from ammonia by the oxidation catalyst 17 are detected at the nitrogen oxide sensor 15.

A second, dotted curve K2 shows, in principle, the mode of function of a real, as-new SCR catalyst 7. This departs from the ideal behavior in the respect that it especially has a maximum achievable conversion rate which is not 100% even in the new state, such that ultimately not all nitrogen oxides in the exhaust gas are actually reduced even when the reducing agent dosed in is fully converted over the SCR catalyst 7. Therefore, the dotted curve K2, unlike the first, solid curve K1 which describes the ideal behavior, does not tend to zero at the value of 1 for the dosage rate.

However, what is common to both curves K1, K2 is that each has a point of intersection, shown in a detail PS, with the target nitrogen oxide value $[NO_x]_S$ at values for the dosage rate of less than 1. Closed-loop control of the nitrogen oxide emissions is preferably effected in such a way that the dosage rate as manipulated variable is affected in such a way that the measurement signal from the first nitrogen oxide sensor 15 is kept within the region of this point of intersection.

A third curve K3 in the form of dashes and dots shows the behavior of an aged SCR catalyst 7 having a distinctly reduced maximum conversion rate. It is then possible that the maximum conversion is so low that, even in the case of a dosage rate of 1, the target nitrogen oxide value $[NO_x]_S$ is not attained, such that the third curve K3 no longer has a point of intersection with the target value and here especially with the horizontal line H. Stable closed-loop control of the nitrogen oxide emissions by variation of the dosage rate D is then no longer possible, resulting in a breakthrough for the SCR catalyst 7.

If a breakthrough for the SCR catalyst 7 is now recognized in the context of the method, the determining parameter is changed toward higher nitrogen oxide concentration downstream of the SCR catalyst 7, which means that the target value $[NO_x]_S$ is increased. This means specifically, with regard to the diagram of FIG. 2, that the horizontal line H is shifted upward in a parallel manner, preferably until a point of intersection with the third curve K3 is again established. Stable closed-loop control of the SCR catalyst 7 is then possible again.

It also becomes clear from the diagram of FIG. 2 why there can be a fall in this case in the actual nitrogen oxide emissions from the internal combustion engine 1 and especially in the nitrogen oxide concentration that actually occurs in the exhaust gas downstream of the SCR catalyst 7, even though the target value is being increased. This is because the SCR catalyst 7 at breakthrough ultimately produces undefined nitrogen oxide emissions that are not amenable to stable closed-loop control of emission. If, by contrast, a point of intersection between the horizontal line H and the third curve K3 is attained again, stable closed-loop control is possible again, such that the nitrogen oxide concentration downstream of the SCR catalyst 7 is established at the target nitrogen oxide value $[NO_x]_S$. It may especially fall by comparison with the operating state of the SCR catalyst 7 at breakthrough, but is established at an elevated value compared to the preceding target nitrogen oxide value.

If no breakthrough is recognized any longer because the emissions are now under stable closed-loop control, the target nitrogen oxide value $[NO_x]_S$ can be lowered again by way of a trial; more particularly, the horizontal line H can thus be shifted back downward in order to check whether the increase has possibly been too high in that stable closed-loop control of emission is still also possible at a lower target value. This lowering by way of a trial can especially be conducted incrementally until a breakthrough of the SCR catalyst 7 is recognized again. If this is the case, a last alteration increment in particular can be reversed, such that there is again a point of intersection of the horizontal line H with the third curve K3 and stable closed-loop control is possible.

Figure 3:
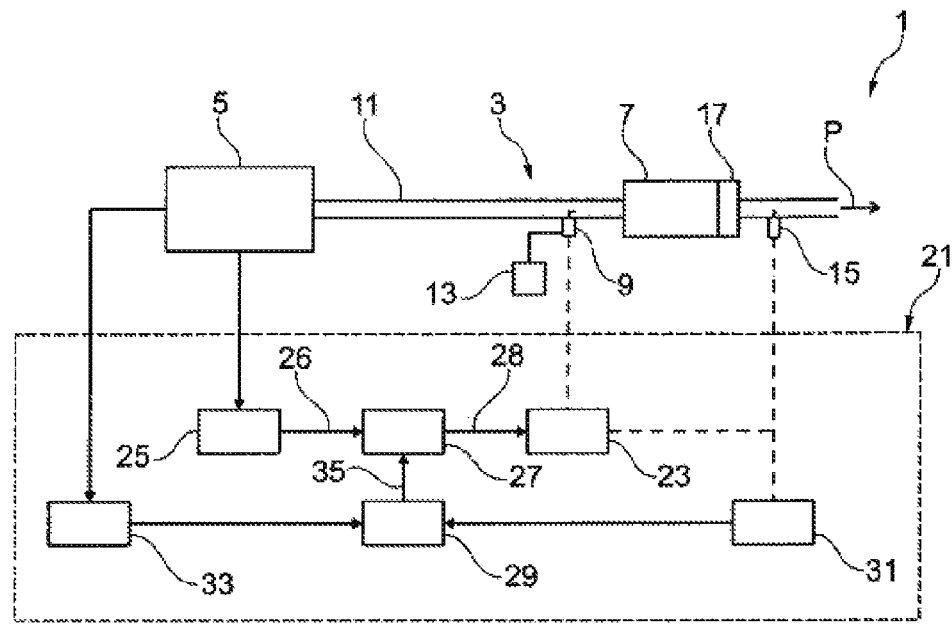
FIG. 3 a schematic diagram of a first embodiment of the method.

FIG. 3 shows a schematic diagram of an embodiment of the method. Identical elements and those having the same function are given the same reference numerals, and so reference is made to the preceding description in this respect.

The control unit 21 has a means of closed-loop emission control 23, which is set up especially for closed-loop control of the nitrogen oxide concentration downstream of the SCR catalyst 7. For this purpose, the means of closed-loop emission control 23 is operatively connected to the first nitrogen oxide sensor 15 on the one hand and to the dosage unit 9 on the other hand for actuation thereof.

The control unit 21 also has a first characteristic map 25 in which predetermined, fixed target values for the nitrogen oxide concentration downstream of the SCR catalyst 7 are recorded, especially as a function of a speed and a torque of the internal combustion engine 1 as initial values for a determining parameter 26. The control unit 21 and especially the characteristic map 25 receives, as input parameters from the engine block 5, a current speed and a current torque of the internal combustion engine 1, and a current target value for the nitrogen oxide concentration downstream of the SCR catalyst 7 is read out as a function of these input parameters as determining parameter 26 from the first characteristic map 25.

A change element 27 is provided, by means of which a changed determining parameter 28 is ascertained. The change element 27 is firstly connected to the first characteristic map 25, such that the change element 27 can be supplied with a current, predetermined and fixed target value for the nitrogen oxide concentration downstream of the SCR catalyst 7 as determining parameter 26. The change element 27 is also connected to a calculation element 29, inputs into the calculation element 29 being firstly the result from a breakthrough recognition element 31 and secondly the result from a steady state recognition element 33.

The breakthrough recognition element 31 is operatively connected to the first nitrogen oxide sensor 15 and set up to recognize breakthrough of the SCR catalyst 7. Accordingly, it reports to the calculation element 29 whether or not a breakthrough has been recognized.

The steady-state recognition element 33 is operatively connected to the engine block 5 in order to recognize whether there is a steady-state operating point. It reports to the calculation element 29 whether there is a steady-state operating point, and especially checks whether there are conditions under which the SCR catalyst 7 is also in a steady state.

The calculation element 29 transmits to the change element 27 the result of a calculation, namely a calculation result 35, which can itself firstly be an adaptation parameter, but secondly is also—in another embodiment of the method—calculated from the adaptation parameter.

The following in particular is apparent: the dosage unit 9 is actuated via the means of closed-loop emission control 23 on the basis of the changed determining parameter 28 which is initially preferably equal to the determining parameter 26. Recognition of breakthrough for the SCR catalyst is conducted by the breakthrough recognition element 31, and then, when a breakthrough is recognized, the determining parameter is changed by means of the calculation element 29 and the determination element 27 toward higher nitrogen oxide concentration downstream of the SCR catalyst 7, and then the dosage unit 9 for dosage of the reducing agent is actuated on the basis of the changed determining parameter 28.

The SCR catalyst 7 operation is permanently monitored by the breakthrough recognition element 31 for a breakthrough.

It is preferably the case that the determining parameter 26 and, correspondingly, the changed determining parameter 28 are a target nitrogen oxide concentration downstream of the SCR catalyst, which are inputs into the means of closed-loop emission control 23 as target value.

In one embodiment of the method, the determining parameter 26 is changed by recalculation on the basis of an adaptation parameter, wherein, in this embodiment of the method, the calculation result 35 in particular is a determining parameter recalculated in the calculation element 29, which is allowed to pass through the change element 27 as changed determining parameter 28. The outcome is as follows: if no breakthrough is recognized, and the actual nitrogen oxide concentration downstream of the SCR catalyst is equal to the predetermined initial value of the determining parameter 26 is, the adaptation parameter in the calculation element 29 is equated to a predetermined inertial value, the result of which is that the predetermined initial value of the determining parameter 26 is used as the changed determining parameter 28. In this case, the change element 27 preferably takes the form of a maximum determination element which uses the determining parameter 26 on the one hand and the calculation result 35 on the other hand to form a maximum, and transmits the greater value, i.e. the maximum, as changed determining parameter 28 to the means of closed-loop emission control 23. Through the choice of the predetermined inertial value for the adaption parameter in the calculation element 29—as will be elucidated in detail later on—the calculation result 35 is then chosen such that it is smaller than the determining parameter 26, such that, in this case, it is passed on to the means of closed-loop emission control 23 as changed determining parameter 28 by the determination element 27. The calculation and the significance of the calculation result 35 for this embodiment of the method will be elucidated in detail in connection with FIG. 5, and so reference is made thereto.

In another embodiment of the method, it is possible that a change in the determining parameter in the change element 27 is conducted by arithmetic combination of the initial value of the determining parameter 26 with the adaptation parameter, it being the case here that the calculation result 35 itself constitutes the adaptation parameter. The change element 27 takes the form here of an addition or summing element. The adaptation parameter is a predetermined differential nitrogen oxide concentration which is calculated by the calculation element 29. This is added to the initial value of the determining parameter 26 in the change element 27, and the result of this addition is passed on to the means of closed-loop emission control 23 as changed determining parameter 28.

In this embodiment of the method too, the adaptation parameter is preferably equal to a predetermined inertial value when the actual nitrogen oxide concentration downstream of the SCR catalyst 7 detected by the first nitrogen oxide sensor 15 is equal to the determining parameter 26. In this case, the predetermined inertial value of the adaptation parameter is preferably zero, and so the calculation result 35 is also then zero, in which case the determining parameter 26 in the change element 27 is not changed owing to the addition of zero, and the original determining parameter 26 is passed on to the means of closed-loop emission control 23 as changed determining parameter 28.

There follows a detailed elucidation of the manner in which the calculation result 35 is calculated in the calculation element 29.

Figure 4:
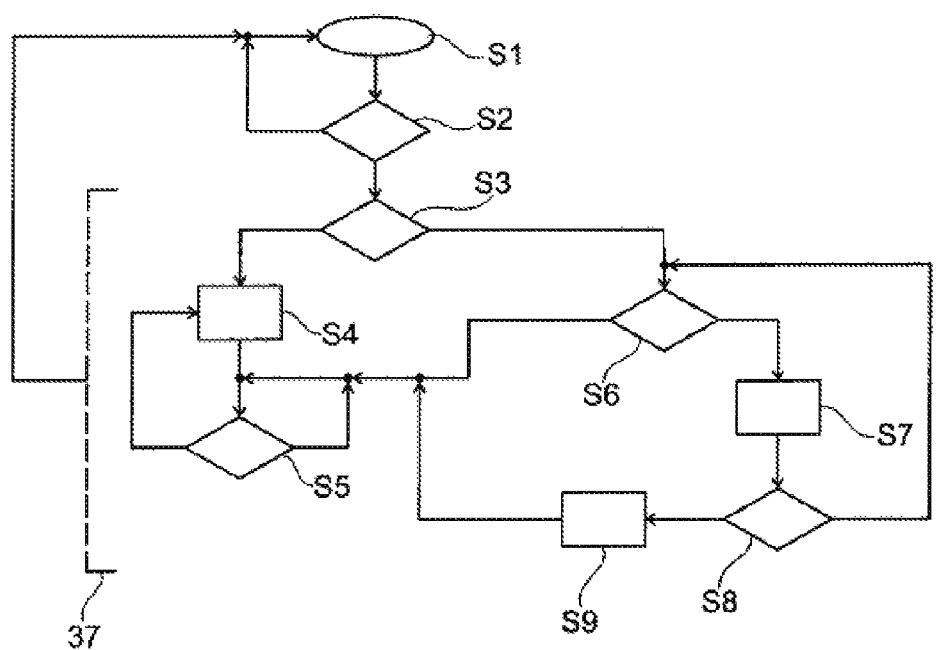
FIG. 4 a schematic diagram of a detail of an embodiment of the method.

FIG. 4 shows a schematic diagram of an embodiment of the method in the form of a flow diagram and especially a calculation of the calculation result 35 in the calculation element 29. The method starts in an initialization step S1. This is followed by a check in a second step S2 as to whether there are steady-state conditions over the SCR catalyst 7. For this purpose, more particularly, the result from the steady-state recognition element 33 is evaluated. If there is no steady state, the method returns to the first step S1 and starts again. If, by contrast, there are steady-state conditions for the SCR catalyst 7, the method advances to a third step S3 in which it is checked whether there is a breakthrough of the SCR catalyst 7. What is checked here is more particularly whether the breakthrough recognition element 31 is reporting a breakthrough or not.

If there is a breakthrough, the method advances to a fourth step S4 in which the adaptation parameter is changed—preferably incrementally. How the adaptation parameter is changed depends on the specific embodiment of the method. If the adaptation parameter is a predetermined nitrogen oxide conversion rate of the SCR catalyst 7, the adaptation parameter is reduced when a breakthrough is recognized. If the adaptation parameter, by contrast, is a predetermined differential nitrogen oxide concentration which is especially added onto the determining parameter 26 in the change element 27, the adaptation parameter is increased when a breakthrough is recognized. In both cases, the effect of the change in the adaptation parameter in the fourth step S4 is ultimately that the changed determining parameter 28 is changed toward a higher nitrogen oxide concentration downstream of the SCR catalyst. The method now jumps to a fifth step S5 in which there is again a check of whether there is a breakthrough of the SCR catalyst 7. If this is the case, the method returns to the fourth step S4, and the adaptation parameter is adjusted again—preferably incrementally, especially with constant increments. In that case, there then again follows the check in the fifth step S5 as to whether there is still a breakthrough at the SCR catalyst 7. This loop is iterated until no breakthrough at the SCR catalyst 7 is recognized any longer. In this case, the method follows a loop back to the fifth step S5, such that the SCR catalyst 7 is permanently monitored for breakthrough, with no change in the adaptation parameter and hence ultimately also in the determining parameter. The method only gets out of this loop when a global escape condition 37 that exists for all steps of the method from the third step S3 onward has been fulfilled, the global escape condition 37 stipulating that there is no longer any steady state of the SCR catalyst 7. If, more particularly, the steady state recognition element 33 recognizes that there are no steady-state conditions any longer, the method according to FIG. 4 is terminated and returns to the first step S1, where it starts again.

If a breakthrough of the SCR catalyst is recognized in the fifth step S5 in the meantime, the method jumps back to the fourth step S4 again, where the adaptation parameter is readjusted and hence the determining parameter is also changed.

If no breakthrough is recognized in the third step S3, the method advances to a sixth step S6 in which there is a check as to whether the adaptation parameter currently has its predetermined inertial value or already has a changed value other than the inertial value. If the adaptation parameter has its predetermined inertial value, the method jumps to the fifth step S5, and it is checked whether there is a breakthrough at the SCR catalyst 7. If this is the case, the method jumps to the fourth step S4 again; if this is not the case, the method moves to the permanent monitoring of breakthrough, with constant repetition of step S5, namely until either a breakthrough of the SCR catalyst 7 is recognized, or until there are no steady-state conditions any longer for the SCR catalyst 7, i.e. the global escape condition 37 is fulfilled.

If, in the sixth step S6, by contrast, it is found that the adaptation parameter has changed, i.e. no longer has its predetermined inertial value, the method advances to a seventh step S7 in which the adaptation parameter is changed counter to the direction of change in the fourth step S4, and preferably in an incremental manner, especially in constant increments. Thus, if the adaptation parameter is increased in the fourth step S4, it is lowered in the seventh step S7. If it is lowered in the fourth step S4, it is increased in the seventh step S7. This takes account of the idea that, in the case in which the adaptation parameter has already been altered but no breakthrough of the SCR catalyst 7 is being recognized in the third step S3, the change in the adaptation parameter in the fourth step S4 has possibly been too great, such that more favorable closed-loop control with regard to the emissions from the internal combustion engine 1 might be possible without breakthrough of the SCR catalyst 7. Therefore, the adaptation parameter in the seventh step S7 is changed back incrementally by way of a trial, and it is then checked in an eighth step S8 whether there is a breakthrough of the SCR catalyst 7 with the adaptation parameter that has been changed back in this way. The increment chosen in the seventh step S7 is preferably exactly the same as the increment in the fourth step S4.

If it is found in the eighth step S8 that there is no breakthrough of the SCR catalyst, this means that stable closed-loop control is also still possible with the adaptation parameter that has been set back by an increment. In this case, the method returns to the sixth step S6, and there is another check of whether the adaptation parameter that has now been set back has reached the predetermined inertial value again, or whether it is still changed proceeding from the predetermined inertial value. The method then either advances to the fifth step S5 if the predetermined inertial value has already been attained again, or the adaptation parameter is set back by a further increment in the seventh step S7, in which case it is then checked again in the eighth step S8 whether there is now a breakthrough of the SCR catalyst 7.

If there is again no breakthrough of the SCR catalyst 7, this method is continued, until it is either found in the sixth step S6 that the predetermined inertial value has been attained or until a breakthrough of the SCR catalyst 7 is recognized in the eighth step S8.

This means that stable closed-loop emission control is no longer possible with the adaptation parameter resulting from the seventh step S7 that has been set back in this way.

Therefore, in a ninth step S9, the last incremental alteration of the adaptation parameter that has been conducted in the seventh step S7 is now discarded, and hence the value of the adaptation parameter that it had prior to the last change in the seventh step S7 is restored. The method then skips to the fifth step S5 in which there is again a check of whether there is a breakthrough of the SCR catalyst 7.

As already indicated, all steps S3, S4, S5, S6, S7, S8, S9 are abandoned when the global escape condition 37 has been fulfilled, i.e. there are no steady-state conditions any longer for the SCR catalyst. The method is accordingly terminated in this case and returns to the first step S1, proceeding from which it is conducted again.

However, the last value of the adaptation parameter which has been determined in the fourth step S4 or in the seventh step S7 is preferably maintained, such that it is available again in a next run of the method.

It is especially the case that data for determination of the adaptation parameter during a first adaptation period, especially a first run of the method proceeding from the first step S1, are recorded in a overwritable characteristic map, namely a learning characteristic map, and they are provided in a second adaptation period, especially namely in a second run of the method proceeding from the first step S1, the second adaptation period following after the first adaptation period in time. Thus, if the method is terminated especially owing to a non-steady state at the SCR catalyst 7 or in the operation of the internal combustion engine 1, the last value of the adaptation parameter attained is then available again in a next method run.

However, it is preferably the case that the overwritable characteristic map, especially the learning characteristic map, is not written with data in predetermined states of operation of the exhaust gas aftertreatment system 3 or units operatively connected thereto, especially of the internal combustion engine 1. These are especially states of operation in which, owing to their irregularity or owing to defects that occur in these states of operation, maladjustment of the closed-loop emission control would take place if the adjusted adaptation parameters attained in these states were to be recorded in the learning characteristic map.

It is also possible that, in particular states of operation of the exhaust gas aftertreatment system 3 or units operatively connected thereto, especially of the internal combustion engine 1, no change in the adaptation parameter takes place if this does not seem sensible owing to the specific nature of such states of operation.

It is preferably the case that, on attainment or exceedance of a limit in the adaptation parameter, especially in the fourth step S4 and/or in the seventh step S7, or on attainment or exceedance of a limit in the actual nitrogen oxide concentration downstream of the SCR catalyst 7, a warning signal is generated. This may, for example, indicate to an operator of the exhaust gas aftertreatment system 3 and/or the internal combustion engine 1 that the SCR catalyst 7 has to be exchanged. Alternatively or additionally, in such case, it is preferable that a decrease in the nitrogen oxide concentration upstream of the SCR catalyst 7 is initiated. For this purpose, preferably, the engine block 5 of the internal combustion engine 1 is actuated with changed parameters in order to bring about lowering of the raw nitrogen oxide emissions. In this case, it may be possible to also still continue to use the aged SCR catalyst 7 before it ultimately has to be exchanged.

Figure 5:
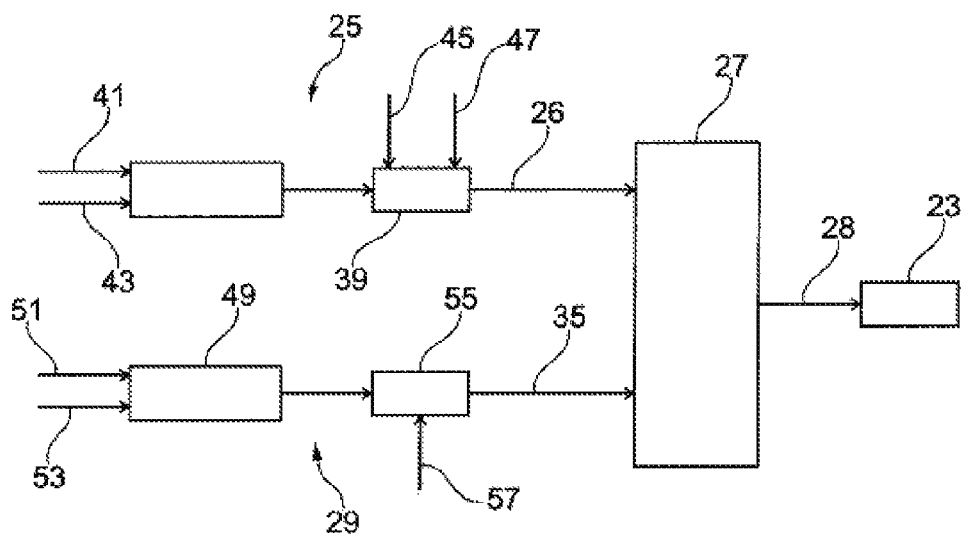
FIG. 5 a further detailed diagram of an embodiment of the method.

FIG. 5 shows a schematic diagram of an embodiment of the method, wherein the adaptation parameter in this embodiment is a predetermined nitrogen oxide conversion rate of the SCR catalyst, wherein FIG. 5 gives a detailed elucidation of the mode of function of the calculation element 29 and of the change element 27 for this embodiment.

The characteristic map 25 here is additionally connected to a first conversion element 39. Inputs into the characteristic map 25 are—as already described—a current speed 41 and a current torque 43 of the internal combustion engine 1. Preferably recorded in the characteristic map 25 are target values for the nitrogen oxide emissions from the internal combustion engine 1 in unit mass per unit power, especially in grams per kilowatt hour (g/kWh), which are converted in the first conversion element 39 as a function of a current mass of exhaust gas 45 which is preferably calculated using a model in the control unit 21 of the internal combustion engine 1, and as a function of a current power 47 of the internal combustion engine which is preferably likewise calculated in the control unit 21 of the internal combustion engine 1, to a nitrogen oxide concentration in the exhaust gas, preferably in ppm. This target nitrogen oxide concentration which results from the first conversion element 39 is preferably the determining parameter 26 which is passed on to the change element 27.

Recorded in the calculation element 29 is preferably a learning characteristic map 49 in which a predetermined nitrogen oxide conversion rate of the SCR catalyst 7 is recorded as adaptation parameter. It is possible that the learning characteristic map 49 is at first initialized with a predetermined nitrogen oxide conversion rate of 100% or 1. Alternatively or additionally, it is also possible that—especially in test bench trials—a maximum conversion rate of the SCR catalyst is calculated firstly from the raw emissions from the internal combustion engine 1 and secondly from the target values of the determining parameter 26, and then the learning characteristic map 49 is initialized with these values.

The values for the adaptation parameter are recorded in the learning characteristic map 49, especially as a function of a temperature 51 of the SCR catalyst 7 and as a function of a current exhaust gas mass flow rate 53, wherein the current exhaust gas mass flow rate 53 is preferably determined in the control unit 21 of the internal combustion engine 1.

The calculation element 29 also has a second conversion element 55 in which the conversion rate read out in an operating point-dependent manner from the learning characteristic map 49 is converted as a function of the raw emissions 57 measured by means of the second nitrogen oxide sensor 19 or calculated in the control unit 21 of the internal combustion engine 1 to a target nitrogen oxide concentration, preferably in ppm, which is passed on to the change element 27 as calculation result 35.

The change element 27 in this case is a maximization element which forms a maximum from the determining parameter 26 on the one hand and the calculation result 35 on the other hand, and in this respect transmits the greater of the two values as changed determining parameter 28 to the means of closed-loop emission control 23.

The values of the adaptation parameter recorded in the learning characteristic map 49 or the corresponding data are especially changed when there is a breakthrough of the SCR catalyst 7, or when they have already been changed and there is no longer any breakthrough of the SCR catalyst 7. More particularly, the values in the learning characteristic map 49 are changed in the course of the method elucidated in connection with FIG. 4, especially in the fourth step S4 or in the seventh step S7 therein.

If the adaptation parameter in this embodiment of the method is equal to the predetermined inertial value, which may, for example, be 100% or 1, the effect of this is that the calculation result 35 is smaller in each case than the determining parameter 26, such that it is passed on by the change element 27 as changed determining parameter 28 to the means of closed-loop emission control 23.

Overall, it is found that, by means of the method, the control unit 21, the exhaust gas aftertreatment system 3 and the internal combustion engine 1, efficient adaptation to aging for an SCR catalyst 7 is possible, such that adaptation to the respective real system is possible without recourse to a complicated aging model that has to be provided with data in a time-consuming manner.

The invention claimed is:

1. A method of operating an exhaust gas aftertreatment system comprising an SCR catalyst, the method comprising the steps of:
Actuating a dosage unit for dosage of a reducing agent based on a determining parameter that affects a nitrogen oxide concentration downstream of the SCR catalyst;
Conducting breakthrough recognition for the SCR catalyst;
Changing the determining parameter, when a breakthrough is recognized, toward higher nitrogen oxide concentration downstream of the SCR catalyst; and
actuating the dosage unit for dosage of reducing agent based on the changed determining parameter.

2. The method according to claim 1, wherein the SCR catalyst in operation is monitored permanently for a breakthrough.

3. The method according to claim 1, wherein the determining parameter is a target nitrogen oxide concentration downstream of the SCR catalyst, wherein the determining parameter is changed by recalculating the determining parameter based on an adaptation parameter that is a predetermined nitrogen oxide conversion rate of the SCR catalyst, wherein
the adaptation parameter is equal to a predetermined inertial value when an actual nitrogen oxide concentration downstream of the SCR catalyst is equal to the determining parameter, wherein
a decrease in the adaptation parameter leads to an increase in the determining parameter, wherein
the adaptation parameter is reduced when a breakthrough is recognized.

4. The method according to claim 3, including determining the adaptation parameter over a specific adaptation period in which the SCR catalyst is in a steady state.

5. The method according to claim 4, including changing the adaptation parameter in the specific adaptation period incrementally toward higher nitrogen oxide concentration downstream of the SCR catalyst when a breakthrough is recognized, wherein the change in the adaptation parameter is ended when no breakthrough is recognized any longer.

6. The method according to claim 4, including changing the adaptation parameter in the specific adaptation period incrementally toward lower nitrogen oxide concentration downstream of the SCR catalyst when no breakthrough is recognized and the adaptation parameter is not equal to the predetermined inertial value, wherein the change is ended as soon as the adaptation parameter is equal to the predetermined inertial value, or as soon as a breakthrough is recognized, wherein, when a breakthrough is recognized, a last alteration increment is reversed again.

7. The method according to claim 4, wherein, when the adaptation parameter is equal to the predetermined inertial value, the adaptation parameter in the specific adaptation period is kept equal to the predetermined inertial value when no breakthrough is recognized.

8. The method according to claim 1, wherein the determining parameter is a target nitrogen oxide concentration downstream of the SCR catalyst, wherein the change in the determining parameter is conducted by arithmetic combination of the determining parameter with an adaptation parameter that is a predetermined differential nitrogen oxide concentration, wherein
the adaptation parameter is equal to a predetermined inertial value when an actual nitrogen oxide concentration downstream of the SCR catalyst is equal to the determining parameter, wherein
an increase in the adaptation parameter leads to an increase in the determining parameter, wherein
the adaptation parameter is increased when a breakthrough is recognized.

9. The method according to claim 1, including generating a warning signal and/or initiating a reduction in a nitrogen oxide concentration upstream of the SCR catalyst on attainment or exceedance of a limit in the adaptation parameter or in the actual nitrogen oxide concentration downstream of the SCR catalyst.

10. The method according to claim 1, including recording data for determination of the adaptation parameter in a overwritable characteristic map during a first adaptation period, wherein the data are provided in a second adaptation period, wherein the second adaptation period follows after the first adaptation period in time.

11. The method according to claim 10, wherein the overwritable characteristic map is not written with data in predetermined states of operation of the exhaust gas aftertreatment system or units operatively connected thereto.

12. An exhaust gas aftertreatment system, comprising:
an SCR catalyst;
a dosage unit; and
a control unit comprising:
a steady state recognition element;
a characteristic map containing predetermined, fixed target values for a nitrogen oxide concentration downstream of the SCR catalyst;
a closed-loop emission control element configured to actuate a dosage unit for dosage of a reducing agent based on a determining parameter from the characteristic map that affects a nitrogen oxide concentration downstream of the SCR catalyst;
a breakthrough recognition element configured to conduct recognition of breakthrough for the SCR catalyst, and, when a breakthrough is recognized, to change the determining parameter toward higher nitrogen oxide concentration downstream of the SCR catalyst;
a calculation element connected to receive inputs from the breakthrough recognition element and the steady-state recognition element; and,
a change element connected to receive inputs from the calculation element and the characteristic map, and connected to output a change parameter to the control element,
wherein the omission control element is configured to actuate the dosage unit for dosage of the reducing agent based on the changed determining parameter.

13. The exhaust gas aftertreatment system according to claim 12, further comprising an oxidation catalyst connected downstream of the SCR catalyst for prevention of an NH3 emission from the exhaust gas aftertreatment system.

* * * * *